Figure 1:
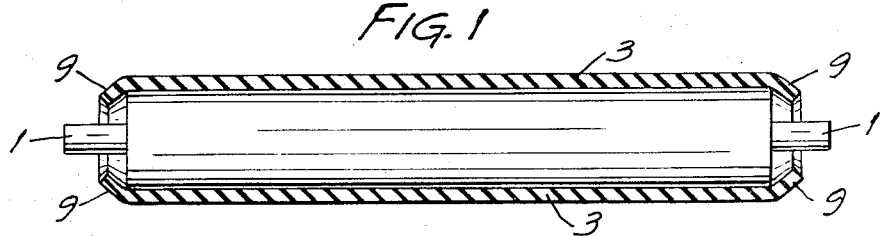

United States Patent [19]

Peterson

[11] 3,724,047

[45] Apr. 3, 1973

[54] INKING SLEEVE
[75] Inventor: Stanley G. Peterson, Minneapolis, Minn.
[73] Assignee: Minnesota Mining and Manufacturing Company, Saint Paul, Minn.
[22] Filed: Aug. 6, 1971
[21] Appl. No.: 169,786

Related U.S. Application Data

[63] Continuation-in-part of Ser. No. 806,535, March 12, 1969, abandoned.

[52] U.S. Cl. ..................................29/129.5, 29/132
[51] Int. Cl. ...........................................B21b 31/08
[58] Field of Search ....................29/122, 129.5, 132

[56] References Cited

UNITED STATES PATENTS

| 1,926,312 | 9/1933 | Smith | 29/122 |
| 2,721,601 | 10/1955 | Spencer | 29/132 X |
| 3,090,106 | 5/1963 | Raymond | 29/129.5 |
| 3,133,340 | 5/1964 | Finelli | 29/132 X |
| 3,229,352 | 1/1966 | Balkin et al. | 29/132 |
| 3,293,728 | 12/1966 | Hill | 29/132 |
| 3,384,051 | 5/1968 | Hunstiger | 29/132 |
| 3,475,803 | 11/1969 | Hill | 29/132 |
| 3,685,443 | 8/1972 | Kusters | 29/132 X |

*Primary Examiner*—Alfred R. Guest
*Attorney*—Kinney, Alexander, Sell, Steldt & Delahunt

[57] ABSTRACT

A polyurethane inking sleeve for assuming a tight gripping relationship with a printing roller body and thereby provide the same with a fresh inking surface. The sleeve is made by mixing millable curable polyurethane elastomer with suitable curing agent, plasticizer, and fillers, forming a sheet of a mixture, overwrapping the sheet on a suitable mandrel, curing the mixture, and grinding the resultant structure to provide a tube with a uniform wall thickness.

4 Claims, 4 Drawing Figures

PATENTED APR 3 1973 3,724,047

INVENTOR
STANLEY G. PETERSON
BY Kinney, Alexander,
Sell, Steldt & DeLaHunt
ATTORNEYS

INKING SLEEVE

This application is a continuation-in-part of my prior copending application Ser. No. 806,535, filed Mar. 12, 1969 now abandoned.

This application relates to printing rollers and more particularly to a removable sleeve for printing rollers and a method of making such a sleeve. The sleeve is made of millable polyurethane.

The term "millable polyurethane" refers to a polyurethane elastomer which can be processed on steel roller equipment, i.e., on a rubber mill or calendar, in the same manner as natural rubber. The elastomer may be broken down or softened by action of the mill, and pigments and other compounding materials may be blended into the softened elastomer on the mill. The conventional use of the term in this manner is described in "Polyurethanes:Chemistry and Technology," by Saunders and Frisch, Part II, pp. 307, 327–8. This is differentiated from liquid cast polyurethane which is available as a liquid and handled in the manner normally associated with viscous liquids.

Polyurethanes of the liquid cast polymer type have been used for printing roller bodies, e.g., see U.S. Pat. Nos. 3,133,307, 3,293,728. In time, the inking surface of such roller bodies becomes worn, requiring replacement either of the entire roller or a rejuvenation of the inking surface generally accomplished by grinding. Grinding is not desired because it causes loss of the desired glassy smooth surface produced in casting. Moreover, grinding is only feasible for one or two times although it is more economical than replacement on those occasions despite the resulting machine down time. After grinding is no longer feasible, the printing surface must be replaced, usually by cutting the roller body from the shaft upon which it was cast and recasting a new roller body, entailing even greater costs and machine down time than grinding. Additionally, a high surface tack is generally obtained on liquid cast polyurethane roller bodies, and while such bodies may be suitable for letterpress where lower tack inks are used, they are not useful in lithography because the high tack generates heat in the ink train tending to dry the ink on the rollers. Furthermore, grinding the surface of liquid cast polyurethane roller bodies is difficult due to the very high abrasion resistance of these materials. Another problem involving liquid cast polyurethane roller bodies is reversion of the polymer to the liquid state. The millable polyurethane elastomers are less prone to reversion and are more easily ground than are liquid cast urethane elastomers.

The sleeve of the invention is a hollow resiliently extensible cylindrical structure formed of a cured plasticized polyurethane composition which has physical properties as hereinafter specified which defined a structure having a balance of strength, elasticity, and toughness which provides a useful, easily installed, replacement inking surface requiring no special mounting attachments to hold it in place on the roller. The sleeve can be readily applied at the printing site without requiring complicated techniques or equipment. Once applied, the sleeve has the ability to be retained on the roller surface without longitudinal movement or slippage during use to provide a renewed printing surface which exhibits suitable printing characteristIcs.

Figure 2:
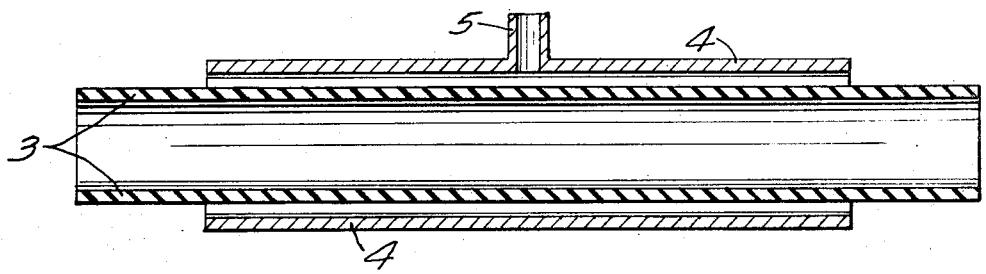
Figure 3:
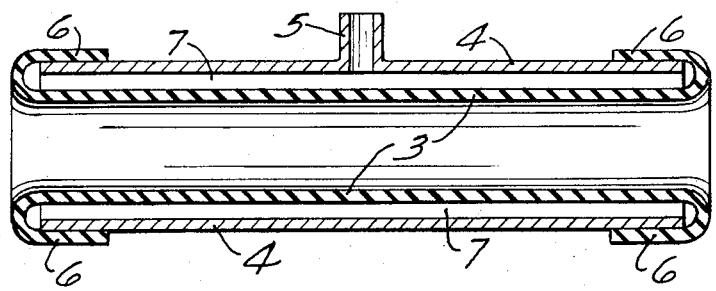
Figure 4:
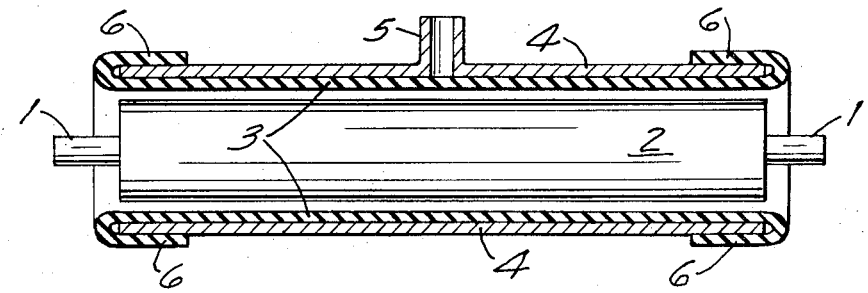

The invention will appear more clearly in the following detailed description when taken in connection with the accompanying drawing wherein:

FIG. 1 is a longitudinal plan view of a printing roller covered by a sleeve, shown in section, according to the invention; and FIGS. 2–4 illustrate various stages in the procedure for applying the sleeves to the roller.

As shown in FIG. 1, the printing roller comprises an axial shaft 1 having an intermediate cylindrical enlargement 2 on which an integral rubbery inking surface layer is provided. Sleeve 3 is added when the surface of the integral rubbery cylindrical enlargement 2 becomes worn. Sleeve 3 assumes a tight gripping relationship with enlargement 2 covering its entire surface and preferably overlapping its ends, e.g., providing overlap portions 9.

In the preparation of the sleeve of this invention, the solid millable polyurethane elastomer is intimately mixed on a rubber mill or other device with fillers, a plasticizer, and a curing agent and the composition calendered into a sheet. Other fillers, extenders, pigments, catalysts and modifiers may be added to the composition as desired to stiffen, reinforce, increase abrasion resistance and tensile strength or otherwise tailor the properties of the sleeve. A continuous hollow cylindrical structure is formed by winding this sheet convolutely on a smooth polished metal mandrel. This sheet is then cured in situ through the application of pressure to the outer surface of the sheet by means of a fabric curing tape and heating from within by passing steam through the hollow metal mandrel or by placing the entire sheet-mandrel combination in an autoclave for the required time period to effect curing.

Following curing, the mandrel supported rubber sleeve is ground to a uniform wall thickness. The sleeve is then everted so as to expose the inner glassy smooth unground surface which will be the fresh inking surface for a printing roller.

The application of this sleeve to the printing roller is preferably accomplished, as shown in FIGS. 2–4, by inserting it into a cylindrical form 4 which has a port 5 to provide a method of air evacuation. Cylindrical form 4 must be so constructed as not to collapse under evacuated conditions. A confined airspace 7 is then created between the inner wall of cylindrical form 4 and the outer wall of sleeve 3 by overwrapping the ends 6 of sleeve 3 upon the ends of the cylindrical form 4. Cylindrical form 4 will of necessity be shorter than rubber sleeve 3 so as to provide sufficient exposure of sleeve on either end to allow overwrapping.

Other means of providing this confined airspace are possible. The overwrap method could be used on one end of the cylindrical form and a cap on the other end. The cap is provided with a central hole through which the sleeve extends providing a friction fit between the outer surface of the sleeve and the inner surface of the hole.

The confined airspace is then evacuated by using a vacuum pump or other air ejection device which is connected by tubing to the port in the wall of the cylindrical form. The evacuation will cause the sleeve to expand radially under the influence of atmospheric pressure so as to increase its diameter. The evacuation is continued until this diameter exceeds the diameter of the printing roller to which the sleeve will be applied.

The printing roller should have a uniformly ground surface prior to application of the sleeve. The printing roller is then slipped into the expanded sleeve and the confined air-space allowed to return to atmospheric pressure by releasing the vacuum. This results in the sleeve attempting to return to its relaxed state and in doing so the sleeve comes into intimate contact with the outer surface of the roller. The sleeve thus assumes a tight gripping relationship with the outer surface of the roller because the roller diameter exceeds the relaxed diameter of the sleeve.

In general, the relaxed inner diameter of the sleeve should be at least 10 percent and preferably 15 percent smaller than the roller diameter. The greater the disparity in roller and sleeve inner diameter (relaxed), the better the gripping action of the latter so long as it is capable of uniform radial expansion to the degree necessary to allow for application to the roller. Consideration must also be given, however, to the effect of expansion on the physical properties of the sleeve. In general, as the sleeve is expanded from the relaxed state, the physical strength of the sleeve approaches failure conditions. Thus, a balance must be struck between expansion to gain the necessary gripping action and non-expansion to retain the maximum physical strength. In general, an expansion of from about 10 percent to about 35 percent and preferably 15 percent to 30 percent may be used.

Lithographic offset press rollers have roller diameters from about 1½ inches to over 4 inches with rubber face lengths from less than 10 inches to over 80 inches. Other types of printing may require sizes beyond these limits. In the diameter range of 2 to 3½ inches I find that a sleeve thickness of about 0.050 inch provides a workable system. Other thicknesses may, of course be used. However, the thinner the product the greater the strength required of it. The upper limit for thickness for roll diameters in the range of 1½ to 4 inches is about 0.150 mils because sleeves of greater thickness are so thick they can no longer be expanded by vacuum. The minimum thickness of the sleeve must be such that the combination of thickness and composition produces a tear strength greater than about 125 psi. This thickness desired will, of course, vary with the polymer used, the particular conditions used in printing and the processing conditions of the sleeve manufacture.

To provide sufficient grip or holding action on the rubber roll base, the sleeve should develop a minimum tension of about 75 pounds per square inch in the sleeve itself and maintain sufficient tension on the roller over an extended period of time. A degree of toughness must be obtained to prevent the accidental breaking or tearing of the sleeve during application and in mild misuse sn the press. The sleeve in its extended applied state must be smooth, abrasion and ozone resistant and have suitable surface tack.

The holding tensile force is determined from the 25 percent modulus which is a measure of the stress at a 25 percent elongation. A minimum desirable tensile force for use with a variety of conditions of press settings and inks is 100 psi. Maintenance of holding force is related to the compression or tension set as an indication of the state of cure. A value of under 25 percent compression set is desirable, tested under ASTM D395-61 method B with the 70° C. - 22 hour heat treatment. Toughness is a combination of tensile strength, elongation, and tear resistance. Preferably, the sleeve should exhibit a tensile strength of a least about 2,000 psi, an elongation of at least 400 percent and a tear strength (ASTM D624-54-Die C) of at least 125 psi and preferably 150 psi. As tear strength approaches 125 psi, tear becomes a problem. Tear strength variation will depend on the particular polymer chosen and the specific conditions of use. A glassy smooth surface is desirable to eliminate possible interference in ink transfer caused by non-uniform contact with printing plates or other rollers. Smoothness of the cured compound can be compared by extending a thin sample in the range of use of the sleeve product (15-20 percent) and noting any knottiness or waviness which might appear in the surface. Knottiness and waviness is often seen in reinforced oil resistant polymers such as chloroprene or nitrile but is not visible with the millable urethane of this invention.

The formative steps of making the sleeves and evaluation of their preformance are given in the specific examples which follow, which examples it is to be understood are for the purposes of illustration only and not determinative of the scope of the invention. Testing data given throughout this specification is obtained at 20° C. and 50 percent relative humidity unless otherwise stated.

Example 1

Printing sleeves are produced from the following ingredients:

| | Parts by weight |
|---|---|
| Millable Polyurethane Elastomer[1] | 100.0 |
| Stearic Acid | 0.2 |
| Semi-reinforcing Carbon Black | 25.0 |
| Calcined Aluminum Silicate[2] | 40.0 |
| Tricresyl Phosphate | 13.0 |
| Dicumyl Peroxide (40% active)[3] | 7.5 |

1. Available under the tradename Genthane SR.
2. Available under the tradename Polyfil Clay.
3. Available under the tradename Di Cup 40 C.

The compound preparation is on a 6 inch by 12 inch laboratory rubber mill equipped with internal water cooling. The millable polyurethane elastomer is passed through the nip at about a 100 mil opening 3 to 4 times without banding to masticate the polymer. The rubber is then allowed to band on one roll and the orifice adjusted to a minimum rolling band of ¼ to ½ inch in diameter. Stearic acid is added to the nip and dispersed by cutting the stock alternately from both sides. The clay is added slowly to the nip followed by about one-half of the plasticizer. After a fairly uniform dispersion is achieved, the band is again cut alternately from both sides, turned over, and fed back into the nip to obtain uniform mixing throughout the thickness of the band. The carbon black is then added slowly, then the remaining plasticizer, and the mixing technique which is described for the addition of the clay is repeated. When uniform mixing has been accomplished the curing agent is added and mixed in by cutting. The batch is then cut from the roll and rolled into a tight roll. The roll is passed vertically through the nip to insure good dispersion. The mill orifice is adjusted to give a band thickness of 0.035 to 0.040 inch. After passing the stock through the mill, the stock is cut off in a single sheet. It is allowed to cool on a silicone coated paper but any releasable surface may be employed or the sheet may be hung to air dry.

The sleeve is then formed on the curing mandrel which is an 18 inch long steel pipe machined and polished to an outside diameter of 1.850 inch. A 14 inch long sheet of rubber is cut and wrapped convolutely in two complete layers plus a slight overwrap on the mandrel. A 2 mil polyester film is placed over the rubber to protect the curing stock and to eliminate any sticking or impression of the curing tape. An 8 foot length of nylon cure tape (obtainable from Bally Mills - No. 7399 - 3¼ inch width) is spirally wrapped under tension over the rubber-mandrel combination. Curing is accomplished in an autoclave set at a steam pressure of 62 psig for 30 minutes. After curing the assembly is cooled by running water through the inside of the mandrel. When cool, the tape and the polyester liner are removed. The exposed surface of the rubber sleeve is ground to give a uniform diameter 0.100 inch larger than that of the mandrel. To accomplish this the mandrel is mounted in a lathe and a conventional tool post mounted motor-driven grinding attachment is used.

Physical testing of this rubber gives the following results:

| | |
|---|---|
| Ultimate tensile strength | 3450 psi |
| Ultimate elongation | 625% |
| 25% modulus | 131 psi |
| Hardness (Durometer) | 60 Shore A |
| Tear | 270 psi |
| Compression set | 14.75% |

The sleeve is everted and mounted by the vacuum expanding technique on an inking form roller for a Model 241 Davidson printing press. The roller is 2.218 inches in outside diameter giving a difference of 0.368 inch between the mandrel and the roller diameters resulting in a sleeve expansion of 19.9 percent over the formed size.

The expanding device is a 12 inch long copper tube having an inner diameter of 2.5 inches with a hose fitting soldered to the outside face to provide a means to connect a vacuum pump.

The sleeve is inserted into the tube and the ends of the sleeve are pulled over the ends of the tube thus forming a confined airspace between the inner wall of the tube and the outer wall of the sleeve. This confined airspace is evacuated to about 28 inches of mercury which causes sufficient expansion of the sleeve to allow the insertion of the printing roller to be covered. Prior to this insertion the surface of the roller is ground so that it has a uniform diameter and surface. After the roller insertion, the vacuum is released and the sleeve relaxes to the roller surface imparting an intimate gripping contact. The overlapped ends are then unfolded and the edges of the sleeve are trimmed so that a slight overhang on the edge of the roller remains.

The covered roller is mounted on the Davidson press with the appropriate adjustments to compensate for the increased diameter. Using this press, with the covered roller, printing tests made with a variety of paper stocks indicate performance at least equal to the original roller surface. Cleanup is accomplished more readily than with a conventional ground surface. After 6 months of intermittent use under a variety of conditions there is no evidence of sleeve shifting on the roller.

The effectiveness of millable polyurethanes in providing a sleeve which is capable of performing as an acceptable printing surface, i.e., it can accept and transfer ink with proper fidelity and remain stationary on the roller body during use, is to be contrasted with other elastomeric materials as demonstrated by Examples 2 and 3.

Example 2

| | Parts by weight |
|---|---|
| Acrylonitrile-Butadiene Copolymer[1] | 100 |
| Zinc Oxide | 5.0 |
| Stearic Acid | 1.5 |
| Semi-reinforcing Carbon Black | 65 |
| Di-Butoxy Ethyl Sebacate | 15 |
| Para Coumarone Resin[2] | 5 |
| Sulfur | 1.75 |
| Benzothiazole Disulfide | 1.5 |

1. Available under the tradename Hycar 1052.
2. Available under the tradename Cumar P-10.

The sleeve is prepared according to the method described in Example 1.

The physical testing of this rubber showed the following properties:

| | |
|---|---|
| Ultimate Tensile Strength | 1850 psi |
| Ultimate Elongation | 400% |
| 25% Modulus | 125 psi |
| Hardness (Durometer) | 62 Shore A |
| Tear - C Die | 226 psi |
| Compression Set | 6.44% |

The sleeve had excellent tear resistance and was easily applied according to the process outlined in Example 1. However, the sleeve when applied to the roller, exhibited a very grainy, knotty surface which produces a printed copy of unacceptable quality.

Example 3

| | Parts by weight |
|---|---|
| 2-Chlorobutadiene 1,3 | 100 |
| Magnesia | 2 |
| Petrolatum | 2 |
| Zinc Oxide | 5 |
| 2-Mercapto thiazoline | 0.5 |
| Calcined Kaolin Clay | 45 |
| Semi-reinforcing Carbon Black | 30 |
| Di-Butoxy Ethyl Sebacate | 20 |

The sleeve is prepared according to the method described in Example 1.

The physical testing of this rubber showed the following properties:

| | |
|---|---|
| Ultimate Tensile Strength | 1360 psi |
| Ultimate Elongation | 330% |
| 25% Modulus | 112 psi |
| Hardness (Durometer) | 58 Shore A |
| Compression Set | 13.36% |
| Tear - C Die | 128 psi |

The forming mandrel for this sleeve had an outer diameter of 1.770 inch. The roller outer diameter was 2.015 inches giving a difference of 0.245 inch which resulted in a 13.8 percent expansion of the sleeve.

When this sleeve is tested as a form roller cover on an Addressograph-Multigraph Model 1250 Offset Duplicator, the sleeve is driven off the roller within 30 minutes of operation due to the tackiness of the sleeve surface. Subsequent surface buffing of the sleeve reduced the driving tendency but produced a surface which lack the desired properties obtained from contact with the polished surface of the mandrel.

What is claimed is:

1. An ink applying sleeve for assuming a tight gripping relationship with a printing roller body, said sleeve when in relaxed condition having an inner diameter at least 10 percent smaller than the roller body diameter, said sleeve comprising a hollow resiliently extensive cylindrical structure having a glassy smooth outer surface and uniform wall thickness of less than 0.150 inch and formed of a cured filled plasticized polyurethane elastomer composition, said sleeve having radial extensibility under the application of about atmospheric pressure of between about 10 and about 35 percent, a tear strength of at least 125 psi, a holding tensile strength of at east 75 psi, a tensile strength of at least 2,000 psi, a compression set of less than 25 percent, and a percent elongation of at least 400 percent.

2. The ink applying sleeve of claim 1 wherein said polyurethane elastomer composition consists essentially of a major portion of polyurethane elastomer and minor portions of fillers and plasticizers.

3. The ink applying sleeve of claim 2 where in said sleeve consists essentially of a polyurethane elastomer composition formed by heat curing 100 parts by weight millable polyurethane elastomer, 7.5 parts by weight dicumyl peroxide, 0.2 parts by weight stearic acid, 25 parts by weight semi-reinforcing carbon black, 40 parts by weight calcined aluminum silicate and 13 parts by weight tricresyl phosphate.

4. An ink applying roller comprising an axial shaft with an intermediate cylindrical enlargement having thereon under tension and in tight gripping relationship the polyurethane ink applying sleeve of claim 3.

* * * * *